United States Patent
Cox et al.

(10) Patent No.: US 6,302,572 B1
(45) Date of Patent: Oct. 16, 2001

(54) BACK VENTED BARREL FOR AN EXTRUDING ASSEMBLY

(75) Inventors: Dan Cox, Kingwood, TX (US); Steven Misiak; Tim Perry, both of Traverse City, MI (US)

(73) Assignee: Century Specialties, Traverse City, MI (US)

( * ) Notice: Subject to any disclaimer, the term of this patent is extended or adjusted under 35 U.S.C. 154(b) by 0 days.

(21) Appl. No.: 09/457,548

(22) Filed: Dec. 9, 1999

(51) Int. Cl.[7] .................. B29B 7/48; B29B 7/84
(52) U.S. Cl. .................. 366/75; 366/76.4; 366/85
(58) Field of Search ............... 366/75, 76.3, 76.4, 366/76.6, 79, 83–85; 425/203, 204, 208, 209

(56) References Cited

U.S. PATENT DOCUMENTS

| | | |
|---|---|---|
| 2,736,058 | 2/1956 | Dellheim . |
| 3,350,742 * | 11/1967 | Wood . |
| 3,457,880 * | 7/1969 | Eppenberger ............... 366/83 |
| 3,657,195 | 4/1972 | Doerfel et al. . |
| 3,704,866 * | 12/1972 | Mosher et al. ............... 366/84 |
| 3,963,558 * | 6/1976 | Skidmore ............... 366/83 |
| 4,063,718 | 12/1977 | Koch . |
| 4,100,244 * | 7/1978 | Nonaka ............... 366/75 |
| 4,124,306 * | 11/1978 | Bredeson et al. ............... 366/75 |
| 4,134,714 | 1/1979 | Driskill . |
| 5,000,670 | 3/1991 | Capelle . |
| 5,080,845 * | 1/1992 | Herrmann et al. ............... 425/203 |
| 5,306,132 | 4/1994 | Grundmann et al. . |
| 5,468,429 * | 11/1995 | Li et al. ............... 425/203 |
| 5,804,111 * | 9/1998 | Kobayashi et al. ............... 425/203 |
| 6,024,479 * | 2/2000 | Haring ............... 425/203 |
| 6,076,954 * | 6/2000 | Gisko ............... 366/75 |

FOREIGN PATENT DOCUMENTS

| | | | |
|---|---|---|---|
| 915689 * | 7/1954 | (DE) | ............... 425/203 |
| 4-161238 * | 6/1992 | (JP) | ............... 366/75 |
| 5-185424 * | 7/1993 | (JP) | ............... 366/75 |

* cited by examiner

*Primary Examiner*—Charles E. Cooley
(74) *Attorney, Agent, or Firm*—Howard & Howard

(57) ABSTRACT

A vent passage (28) extends from a main extruder passage (24) and is spaced from and between a feed extruder passage (26) and a back surface (16) of the barrel (10). The barrel (10) is characterized by the vent passage (28) being disposed to extend from the top surface (12) into the main extruder passage (24) and a vent passage adapter (36) in the vent passage (28) for controlling the venting of gases. The vent passage adapter (36) includes a restrictor member (44) extending downwardly from a mounting plate (38) to form a restricted passage (46) with a screw cover (40). The restrictor member (44) is removably attached to the mounting plate (38) whereby it may be removed for a less restricted venting of gases.

17 Claims, 3 Drawing Sheets

BACK VENTED BARREL FOR AN EXTRUDING ASSEMBLY

BACKGROUND OF THE INVENTION

1. Field of the Invention

The subject invention relates to a barrel in an extruding assembly of the type for the continuous blending and plasticizing of a heat softenable and curable molding compound and, more specifically, to a particular arrangement for venting gases.

2. Description of the Prior Art

Assemblies for extruding plastic are well known and frequently include a main extruder unit and a feed extruder unit in series to feed material to the main extruder. Each unit has a pair of screws independently driven for varying rotational speeds. The main extruder unit includes a back vented barrel having top, bottom, front, back and first and second side surfaces. A main extruder passage extends between the front and back surfaces, a feed extruder passage extends from the first side surface and into the main extruder passage, and a vent passage extends from the main extruder passage and is spaced from and between the feed extruder passage and the back surface. An example of such an assembly is disclosed in U.S. Pat. Nos. 4,063,718 to Koch and 4,134,714 to Driskill. As the background in each of these patents relates, the relative placement between the various passages can be critical to maximizing the performance of the assembly. In addition, it is important that the assembly have versatility for processing various different materials.

SUMMARY OF THE INVENTION AND ADVANTAGES

A back vented barrel defined by a block having top, bottom, front, back and first and second side surfaces. A main extruder passage extends between the front and back surfaces, a feed extruder passage extends from the first side surface and into the main extruder passage, and a vent passage extends from the main extruder passage and is spaced from and between the feed extruder passage and the back surface. The barrel is characterized by the vent passage extending from the top surface into the main extruder passage.

Accordingly, the subject invention places the vent passage in the top of the barrel to maximize venting performance over a wide range of conditions. The positioning of the vent passage eliminates the costly loss of material and creates a cleaner environment. The design also allows considerably higher levels of addition of the unmixed material as well as unmixed materials possessing low bulk density characteristics due to entrapped air. Furthermore, the vent passage is provided with a universal vent control for varying the restriction in the vent passage while allowing one vent adapter to function for two types of material, i.e., mixed and umnixed.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a back vented barrel for an extruding assembly is generally shown at 10.

Figure 1:
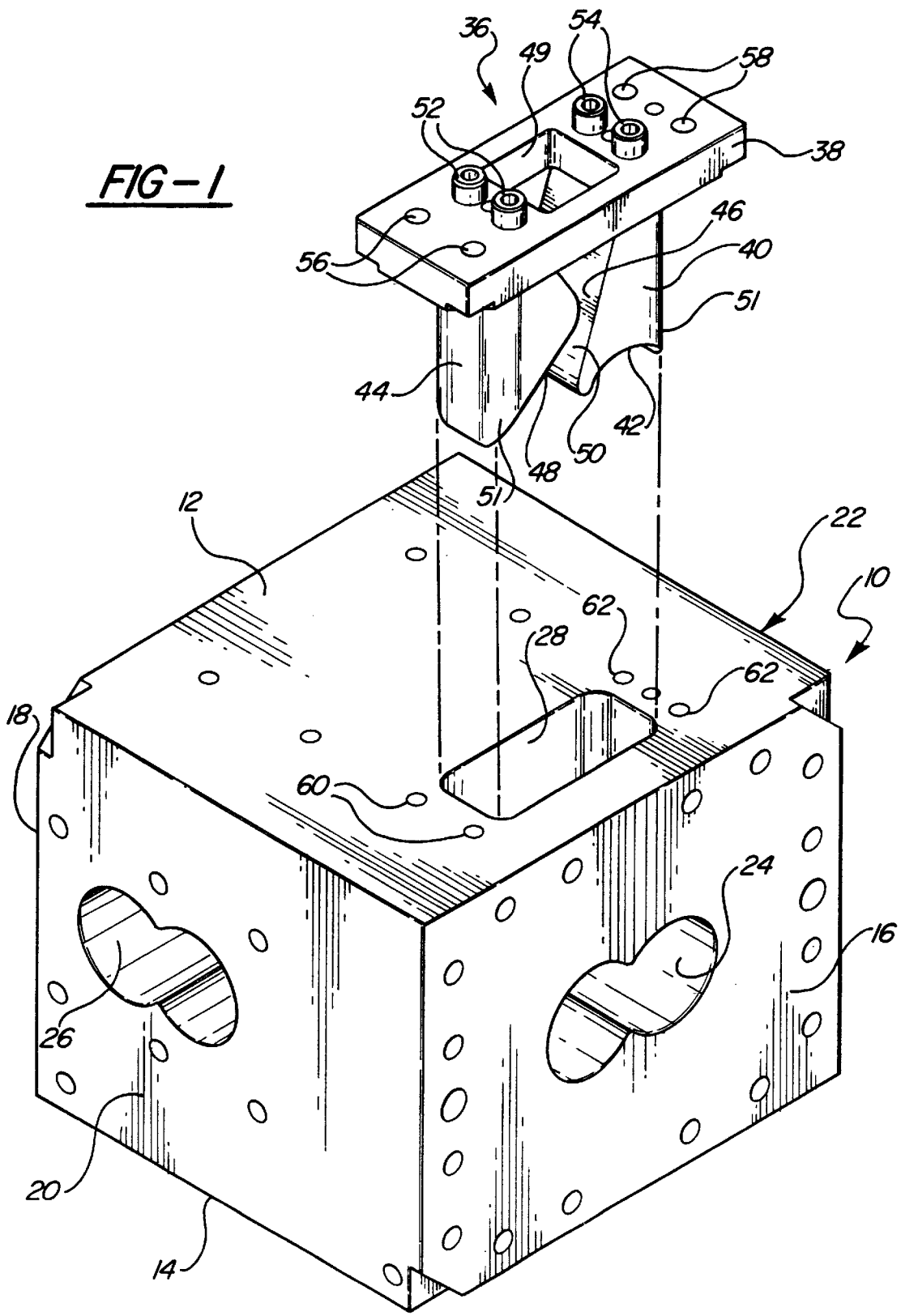
FIG. 1 is an exploded perspective view of a preferred embodiment of the subject invention.
Figure 2:
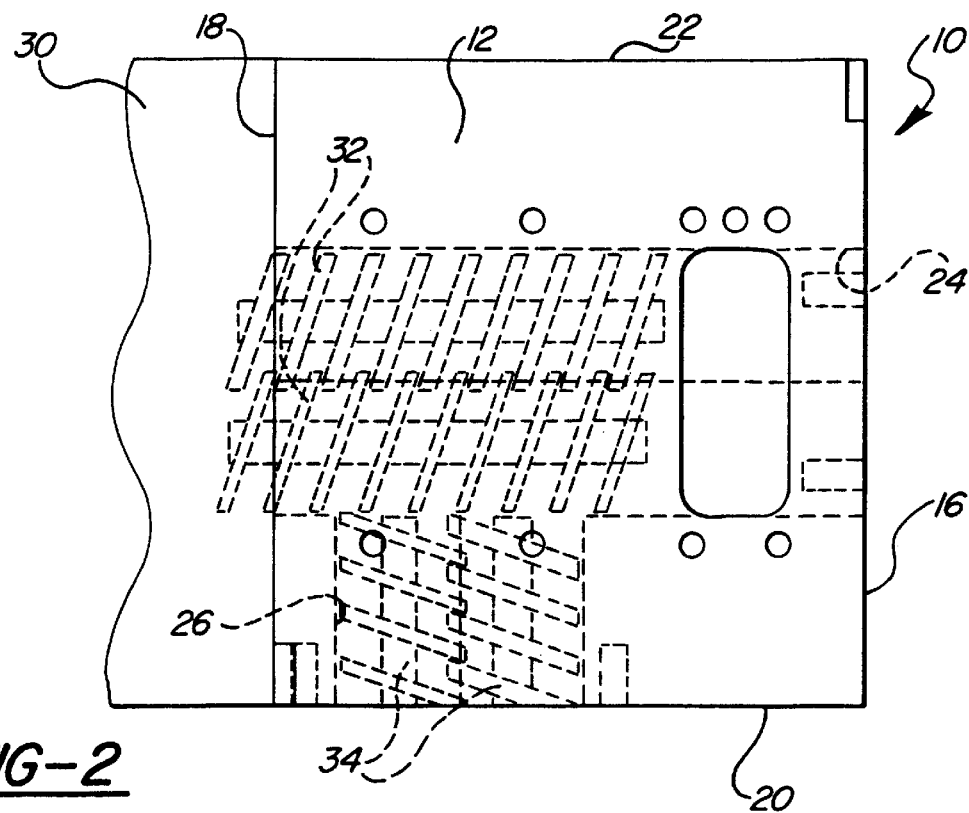
FIG. 2 is a fragmentary top view of the barrel.
Figure 3:
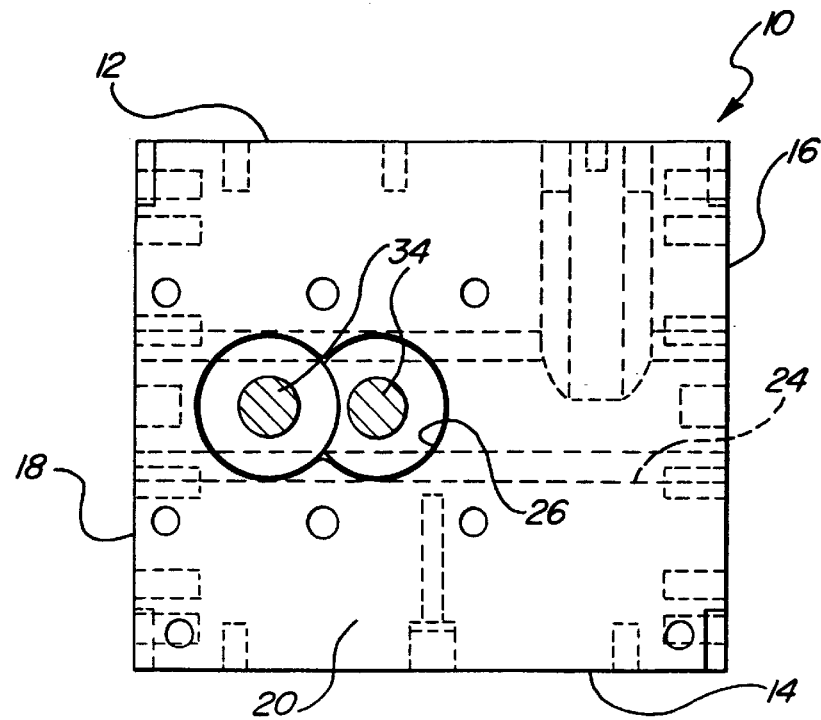
FIG. 3 is side elevational view of the barrel.
Figure 4:
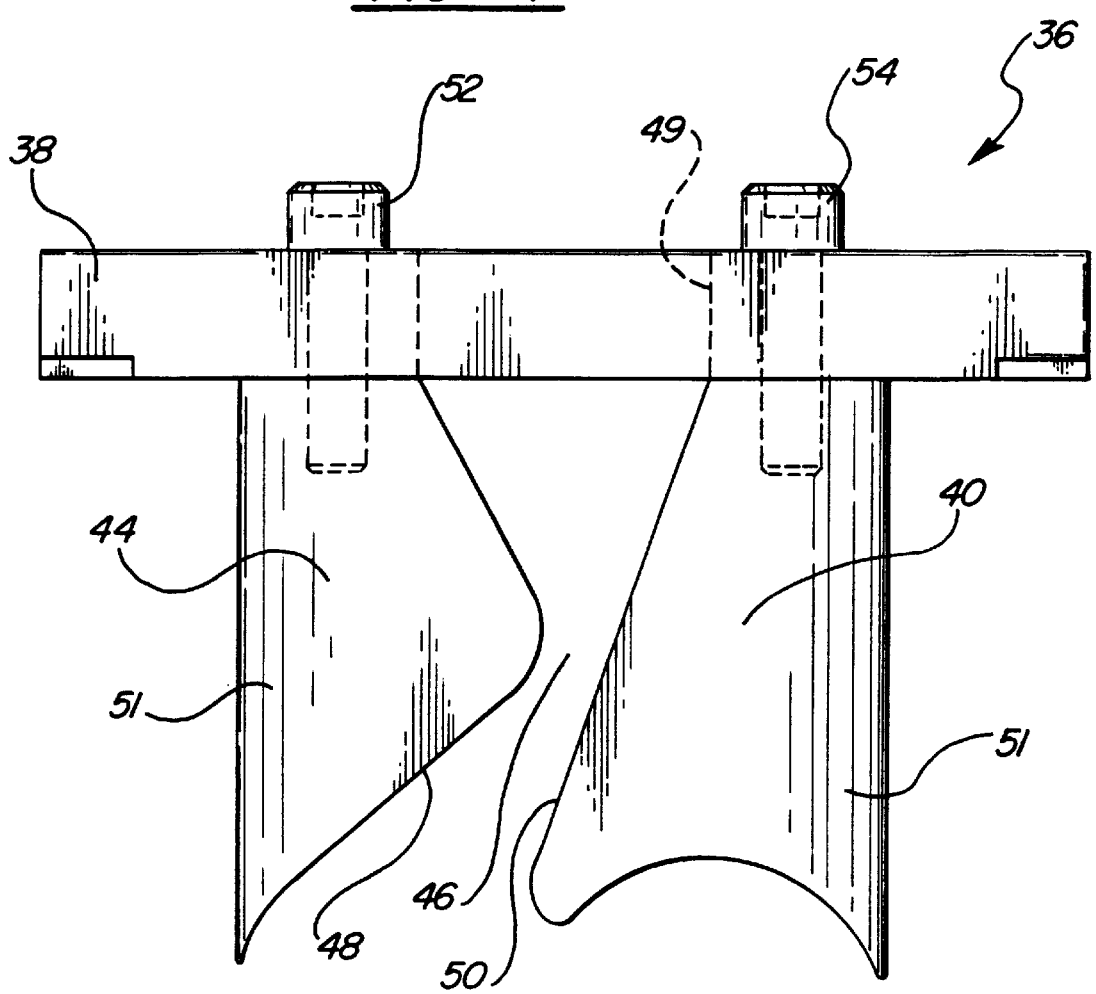
FIG. 4 is side elevational view of the vent passage adapter.

The barrel 10 comprises an integral or homogenous block of metal having a top surface 12, a bottom surface 14, a front surface 18, a back surface 16 and first 20 and second 22 side surfaces. A main extruder passage 24 extends between the front 18 and back 16 surfaces. A feed extruder passage 26 extends from the first side surface 20 and into the main extruder passage 24 defining a downstream portion of the block between the feed extruder passage 26 and the front surface 18 and defining an upstream portion of the block between the feed extruder passage 26 and the back surface 16. A vent passage 28 extends from the main extruder passage 24 and is spaced from and between the feed extruder passage 26 and the back surface 16. As shown in FIG. 2, an extruder housing 30 is connected to the front surface 18 of the block 10 to house a first pair of twin rotating extruder screws 32 extending into the main extruder passage 24. In a similar fashion, a second pair of twin rotating extruder screws 34 are disposed in the feed extruder passage 26 at a right angle to the main extruder passage 24. The feed extruder passage 26 and the main extruder passage 24 each have a cross section defined by two overlapping circles for closely surrounding the twin rotating screws 32 and 34. The main extruder passage 24 has a portion extending between the feed extruder passage 26 and the vent passage 28 so as to separate the feed extruder passage 26 from the vent passage 28.

The barrel 10 is characterized by the vent passage 28 being disposed to extend from the top surface 12 into the main extruder passage 24.

The assembly also includes a vent passage adapter, generally shown at 36, for disposition in the vent passage 28 for controlling the venting of gases. The vent passage adapter 36 includes a mounting plate 38 for attachment to the top surface 12 of the barrel and a screw cover 40 descending from the mounting plate 38 and having an arcuate lower end 42 for surrounding an extruder screw 32. The vent passage adapter 36 can also include a restrictor member 44 extending downwardly from the mounting plate 38 to form a restricted passage 46 with the screw cover 40. More specifically, the restrictor member 44 and the screw cover 40 present converging surfaces 48 and 50 respectively leading to the restricted passage 46 there between. The mounting plate 38 defines a vent hole 49 above the restricted passage 46 for venting gases. The vent passage 28 is generally rectangular in cross section with rounded corners and the screw cover 40 and the restrictor member 44 each have rounded corners 51 which are complementary to the vent passage 28.

The mounting plate 38 may include one or more but, as disclosed, includes a first pair of bolt holes on a first side of the vent hole 49 and extending through the mounting plate 38 for fasteners or bolts 52 to extend through the mounting plate 38 and threadedly engage the restrictor member 44 for removably attaching the restrictor member 44 to the mounting plate 38. In like fashion, the mounting plate 38 includes a second pair of bolt holes on a second side of the vent hole 49 and extending through the mounting plate 38 for fasteners or bolts 54 to extend through the mounting plate 38 and threadedly engage the screw cover 40 for removably attaching the screw cover 40 to the mounting plate 38. In addition, the mounting plate 38 includes a first pair of mounting holes 56 on the first side of the first pair of bolt holes and extending through the mounting plate 38 for fasteners to extend there through to threadedly engage a pair of tapped holes 60 in the barrel and a second pair of mounting holes 58 on the second side of the second pair of bolt holes and extending through the mounting plate 38 for fasteners to extend there through to threadedly engage a pair of tapped holes 62 in the barrel 10.

By removably attaching the restrictor member 44 to the mounting plate 38, a versatility in the venting of gases is achieved with one vent passage adapter 36. The vent passage adapter 36 stops either mixed or unmixed material from venting through the top vent hole 49.

The invention has been described in an illustrative manner, and it is to be understood that the terminology which has been used is intended to be in the nature of words of description rather than of limitation.

Obviously, many modifications and variations of the present invention are possible in light of the above teachings and the invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth an old and well known combination in which the invention resides and these antecedent recitations should be interpreted to cover any combination in which the inventive novelty has utility. In addition, the reference numerals are merely for convenience and are not to be in any way to be read as limiting.

What is claimed is:

1. A back vented barrel for an extruding assembly comprising;
    a block having a top surface (12), a bottom surface (14), a front surface (18), a back surface (16), and first (20) and second (22) side surfaces,
    a main extruder passage (24) extending between said front (18) and back (16) surfaces,
    a feed extruder passage (26) extending from said first side surface (20) and into said main extruder passage (24),
    a vent passage (28) extending from said top surface (12) into said main extruder passage (24),
    a vent passage adapter (36) selectively disposed in said vent passage (28) for controlling the venting of gases, said vent passage adapter (36) including a mounting plate (38) for attachment to said top surface (12) of said block,
    at least one of a restrictor member (44) and a screw cover (40) mounted to and descending from said mounting plate (38),
    a first attachment hole disposed within said mounting plate (38) for providing a mounting point for said restrictor member (44), and a second attachment hole disposed within said mounting plate (38) spaced from said first attachment hole for providing a mounting point for said screw cover (40) in spaced relationship to said restrictor member (44) such that said restrictor member (44) and said screw cover (40) may both be mounted to and removed from said mounting plate (38) independently of each other.

2. A back vented barrel as set forth in claim 1 wherein said screw cover (40) has an arcuate lower end (42) for surrounding an extruder screw.

3. A back vented barrel as set forth in claim 1 wherein said barrel consists of a unitary block, said feed extruder passage (26) and said main extruder passage (24) each having a cross section defined by two overlapping circles for twin rotating screws.

4. A back vented barrel as set forth in claim 3 in combination with a first pair of twin rotating extruder screws in said main extruder passage (24) and a second pair of twin rotating screws in said feed extruder passage (26).

5. A back vented barrel as set forth in claim 1 further including a first fastener (52) removably disposed within said first attaching hole for removably attaching said restrictor member (44) to said mounting plate (38).

6. A back vented barrel as set forth in claim 1 further including a second fastener (54) removably disposed within said second attaching hole for removably attaching said screw cover (40) to said mounting plate (38).

7. A back vented barrel as set forth in claim 1 wherein said vent passage (28) is disposed between said feed extruder passage (26) and said back surface (16).

8. A back vented barrel as set forth in claim 7 wherein said vent passage (28) is generally rectangular in cross section.

9. A back vented barrel as set forth in claim 1 wherein said restrictor member (44) and said screw cover (40) form a restricted passage (46) there between when said restrictor member (44) and said screw cover (40) are both mounted to said mounting plate (38).

10. A back vented barrel as set forth in claim 9 wherein said restrictor member (44) and said screw cover (40) present converging surfaces (48) and (50) leading to said restricted passage (46) there between.

11. A back vented barrel as set forth in claim 9 wherein said mounting plate (38) defines a vent hole (49) above said restricted passage (46) for venting gases.

12. A back vented barrel as set forth in claim 11 wherein said first attachment hole is on a first side of said vent hole (49) and said second attachment hole is on a second side of said vent hole (49) opposite from said first side such that said restrictor member (44) and said screw cover (40) can be removably mounted to opposite sides of said vent hole (49).

13. A back vented barrel as set forth in claim 12 wherein said first attachment hole is further defined as a first pair of bolt holes on said first side of said vent hole (49) extending through said mounting plate (38).

14. A back vented barrel as set forth in claim 13 further including a pair of first fasteners (52) threadingly engaging said first pair of bolt holes and said restrictor member (44) for removably attaching said restrictor member (44) to said mounting plate (38).

15. A back vented barrel as set forth in claim 14 wherein said second attachment hole is further defined as a second pair of bolt holes on said second side of said vent hole (49) extending through said mounting plate (38).

16. A back vented barrel as set forth in claim 15 further including a pair of second fasteners (54) threadingly engaging said second pair of bolt holes and said screw cover (40) for removably attaching said screw cover (40) to said mounting plate (38).

17. A back vented barrel as set forth in claim 16 wherein said mounting plate (38) includes a first pair of mounting holes (56) on said first side of said vent hole (49) and extending through said mounting plate (38) to threadingly engage said block, and wherein said mounting plate (38) includes a second pair of mounting holes (58) on said second side of said vent hole (49) and extending through said mounting plate (38) to threadingly engage said block.

* * * * *